(12) United States Patent
Barreiro et al.

(10) Patent No.: US 9,916,492 B1
(45) Date of Patent: Mar. 13, 2018

(54) IMAGE PROCESSING AND ANALYSIS FOR UID OVERLAP AVOIDANCE

(71) Applicant: SkySlope, Inc., Sacramento, CA (US)

(72) Inventors: Michael J. Barreiro, West Sacramento, CA (US); Tyler Smith, Sacramento, CA (US)

(73) Assignee: SkySlope, Inc., Sacramento, CA (US)

( * ) Notice: Subject to any disclaimer, the term of this patent is extended or adjusted under 35 U.S.C. 154(b) by 0 days.

(21) Appl. No.: 15/465,468

(22) Filed: Mar. 21, 2017

(51) Int. Cl.
    *G06K 9/00*     (2006.01)
    *G06T 7/90*     (2017.01)

(52) U.S. Cl.
    CPC ..... *G06K 9/00161* (2013.01); *G06K 9/00442* (2013.01); *G06T 7/90* (2017.01)

(58) Field of Classification Search
    CPC ... G06K 9/00161; G06K 9/00442; G06T 7/19
    See application file for complete search history.

(56) References Cited

U.S. PATENT DOCUMENTS

| | | | |
|---|---|---|---|
| 6,185,683 B1 | 2/2001 | Ginter et al. | |
| 8,406,462 B2 * | 3/2013 | Radhakrishnan | G06K 9/00744 382/100 |
| 2002/0009208 A1 | 1/2002 | Alattar et al. | |
| 2002/0122568 A1 | 9/2002 | Zhao | |
| 2003/0007691 A1 * | 1/2003 | Adachi | G06K 9/00154 382/219 |
| 2004/0078333 A1 | 4/2004 | Hilton et al. | |
| 2008/0100874 A1 | 5/2008 | Mayer | |
| 2008/0187241 A1 * | 8/2008 | Talati | G06K 9/3233 382/282 |
| 2011/0222768 A1 * | 9/2011 | Galic | G06K 9/38 382/170 |
| 2014/0172408 A1 * | 6/2014 | Vukosavljevic | G06F 17/211 704/2 |
| 2014/0267193 A1 * | 9/2014 | Barton | G06F 3/0386 345/182 |
| 2015/0146265 A1 * | 5/2015 | Kim | G06K 9/00442 358/450 |

(Continued)

OTHER PUBLICATIONS

Automatically Avoid Overlapping the Contents when Adding Bates Number to PDF on Mac—Easy Bates, Jul. 21, 2015; Available at: https://www.youtube.com/watch?v=Dq1-xwSznol; Accessed on: Jan. 24, 2017.

(Continued)

*Primary Examiner* — Mekonen Bekele
(74) *Attorney, Agent, or Firm* — Daylight Law, P.C.

(57) ABSTRACT

A method for preventing overlap during the application of a universal identifier (UID) to a signature document in an electronic signature service is disclosed. The method includes parsing an image file of the signature document to obtain a content vector. A set of addresses of the content vector uniquely correspond with a set of locations in the image. Each value in the content vector indicates content at a corresponding location in the image. The method also includes measuring an overlap quantity for a potential UID location using the content vector to measure the overlap quantity. The method also includes selecting a UID location in the signature document using the overlap quantity. The method also includes applying the UID to the signature document using the UID location.

24 Claims, 5 Drawing Sheets

(56) References Cited

U.S. PATENT DOCUMENTS

2015/0186365 A1* 7/2015 Pitzo ................ G06F 17/30011
                                                                707/608
2016/0321214 A1* 11/2016 Hickey ................ G06F 3/0484

OTHER PUBLICATIONS

Easy Bates, Rennie Glen Software, LLC, Home Page, Accessible at: http://www.pdfsnake.com/easybates/index.html, Accessed on: Mar. 7, 2017.

* cited by examiner

FIG. 4

IMAGE PROCESSING AND ANALYSIS FOR UID OVERLAP AVOIDANCE

BACKGROUND OF THE INVENTION

Electronic signature services are increasing in importance in step with the increasing digitalization of modern work flows. Regulations sanctioning the use of electronic signatures have matured to the point where it is common to use electronic signatures for a myriad of documents without a user pausing to question if the contract will be enforceable or not. The enforceability of contracts executed using an electronic signature service, as set by the regulations controlling their use, is dependent upon the electronic signature service retaining a record of the execution of the contract. The record can be keyed to a string of characters. The string of characters can then be written onto the executed contract and printed out to link the physical instantiation of the executed contract with the electronic record of the contract's execution. The string of characters can be referred to as a universal identifier (UID) or global universal identifier.

FIG. 1 provides an illustration of a contract 100 as it would appear in a print out or on a monitor after having been executed. The contract will generally be provided by a user of the electronic signature service, and the electronic signature service may have no ex ante knowledge of the content of the contract. As illustrated, the contract has been executed and the electronic signature service has applied UID 101 to the contract. The location on the contract where the UID appears is determined by the electronic signature service. However, the user that produces or uploads the contract itself may include their own information in the margins of the document, such as a barcode 102, or some other mark. These marks may overlap with the UID and make the UID or the mark illegible. In addition, the contract may include content that extends to border areas of the document. As illustrated, signature block 103 overlaps with UID 101 and the content of both UID 101 and signature block 103 has been obscured. Aside from looking less professional and polished, the application of the UID to the document in this manner renders the UID less capable of serving its intended purpose and may obscure important content of the underlying signature document.

SUMMARY OF THE INVENTION

Certain approaches disclosed herein prevent an overlap condition between a UID and the content of the signature document to which the UID is being applied without altering the content of the signature document or UID. The approaches include methods for identifying potential locations for the UID to be applied. Some of the approaches include methods for selecting among those potential locations based on a quantitative determination of how much overlap is caused by the placement of the UID in any of those potential locations. Some of the approaches additionally include a qualitative determination of the degree of harm caused by the overlap of the UID and the signature document if the UID is placed in any of those potential locations.

Some approaches disclosed herein involve a method for preventing overlap during the application of a universal identifier (UID) to a signature document in an electronic signature service is disclosed. The method includes parsing an image file of the signature document to obtain a content vector. A set of addresses of the content vector uniquely correspond with a set of locations in the image. Each value in the content vector indicates content at a corresponding location in the image. The method also includes measuring an overlap quantity for a potential UID location using the content vector to measure the overlap quantity. The method also includes selecting a UID location in the signature document using the overlap quantity. The method also includes applying the UID to the signature document using the UID location. Also disclosed is a non-transitory computer-readable medium storing instructions for the execution of the aforementioned method and means for executing all of the individual steps in the aforementioned method.

BRIEF DESCRIPTION OF THE DRAWINGS

FIG. 4 is an illustration of various methods for measuring an overlap condition during the application of a UID to a signature document in accordance with certain approaches disclosed herein.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

An electronic signature service can be beneficially designed to operate with any given signature document, including signature documents for which the electronic signature service has no ex ante knowledge. To maximize flexibility for users of the electronic signature service, any document that can be signed should be capable of being instantiated and executed by the service. Furthermore, certain highly sensitive documents are purposefully kept separate from the servers that execute the supporting signatures, so there is an intentional disconnect between the content and execution of the document. Finally, resources of the electronic signature service can be conserved by limiting the number of times a full image of the signature document is transmitted or stored by the electronic signature service. However, without knowledge of the signature document, the electronic signature service cannot determine where to apply the UID or other marks to the signature document to avoid overlap with the document's content.

There are various approaches for assuring that a UID applied by an electronic signature service does not overlap portions of the signature document to which it is applied. Users can be given the ability to alter the location of the UID while they are specifying a template for the signature document. In addition, users could be alerted before they execute a signature document, or save a template for a signature document, that the UID in the executed document or template will conflict with the content of the signature document. In response, the user could then adjust the location of the UID via a drag and drop action, or by selecting from various preset locations (e.g., top, left, right, or bottom margins). However, the UID is not generally something users are accustomed to having to be concerned with, and adding this additional step does not add to the experience of using an electronic signature service. Instead, the location for the UID could be handled automatically, and users could be given the ability to set preferences for the manner in which the UID was automatically applied if they desired.

Figure 2:
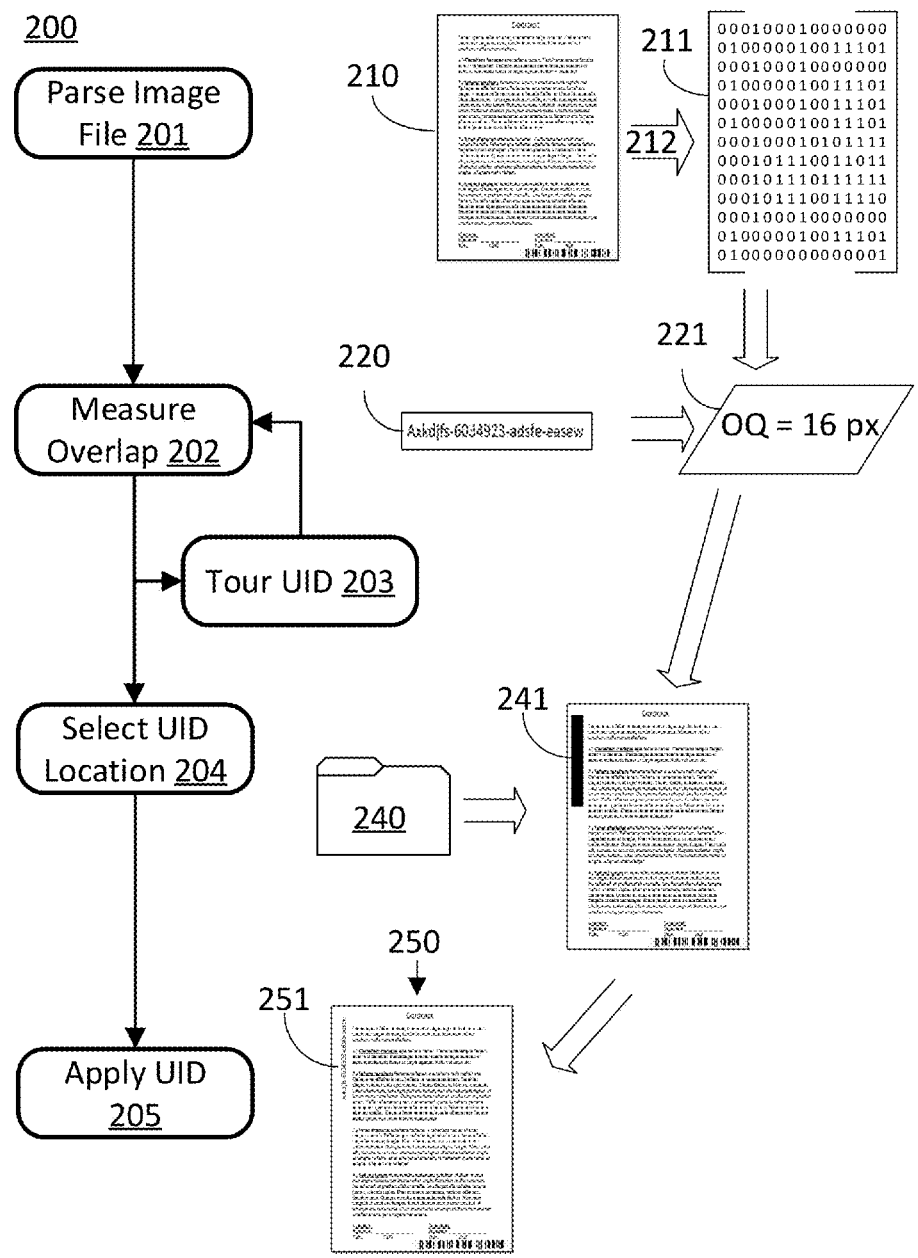
FIG. 2 is a flow chart for a set of methods for preventing overlap during the application of a UID to a signature document in an electronic signature service in accordance with certain approaches disclosed herein.

FIG. 2 includes a flow chart for a set of methods for preventing overlap during the application of a UID to a signature document in an electronic signature service. The methods involve the automatic application of the UID to the document in a manner that prevents, or at least mitigates, an overlap condition between the UID and the content of the document. In certain approaches the automatic application of the UID is assisted by a human user via the provisioning of ex ante preferences as to the location of the UID or via a selection from among a limited set of possible placements for the UID as determined by the electronic signature service while processing an image file of the signature document. Conceptual diagrams are provided along with the flow chart to illustrate specific approaches for each of the steps in the flow chart. The following disclosure includes a brief explanation of flow chart 200 followed by a more detailed discussion of each step.

Flow chart 200 begins with a step 201 of parsing an image file of a signature document to obtain a content vector. A set of addresses of the content vector uniquely corresponds with a set of locations in the image, and each value in the content vector provides information regarding the content at the corresponding location in the image. The step is illustrated by an image 210, being parsed by a process 212, to produce a content vector 211. In the illustrated case, the content vector is a two dimensional matrix of binary values where each location in the matrix corresponds with a pixel in the signature document and each value at that location is a one if the pixel includes content and is a zero if the pixel does not include content.

Flow chart 200 continues with a step 202 of measuring an overlap for a potential UID location. The measurement may produce an overlap quantity and may also include an overlap quality factor. A content vector for the signature document can be used during this step to measure the overlap quantity. The overlap quantity can be a scalar value that is proportional to a number of pixels of overlap between the UID and the content of the signature document. As illustrated, content vector 211 is combined with information regarding the UID 220 to produce overlap quantity 221. The illustrated quantity is an integer value stored in memory with a variable name "OQ" and a value equal to 16. In this case, the overlap quantity is equal to 16 pixels. The first execution of step 202 can involve the selection of a potential location of the UID at a default location within the signature document that is set by the electronic signature service or by a user on an individual basis. Step 202 can be repeated numerous times to obtain multiple overlap quantities via the addition of a touring step 203 in which the potential location of the UID within the signature document is altered, and a new measurement is obtained.

Flow chart 200 continues with a step 204 of selecting a UID location in the signature document. The execution of step 204 can utilize the overlap quantity 221. The execution of step 204 can also utilize any other overlap quantity values obtained through additional executions of step 202 if they were conducted. In one example, the UID would be placed at a location associated with the lowest overlap quantity from a set of overlap quantities obtained through repeated executions of step 202. For example, the process could involve obtaining a non-zero overlap quantity for placement of the UID in the four corners of the document, and place the UID in the corner associated with the lowest overlap quantity. In some approaches, the execution of step 204 could include the utilization of a subjective preference file 240. The subjective preference file can include a ranking of which potential locations for the UID are most favored by the particular user that is executing the signature document. As illustrated, UID location 241 has been selected because the overlap quantity associated with that location is zero and that selected location is deemed acceptable in the subjective preference file 240.

Figure 1:
FIG. 1 is an illustration of a UID overlap condition caused by an electronic signature service in accordance with the related art.

Flow chart 200 terminates with a step 205 of applying the UID to the UID location selected in the execution of step 204. Step 204 can also be given the option to execute every time a new overlap quantity 221 is obtained, and can execute immediately along with step 205 to allow for the placement of the UID at a given location if the overlap quantity associated with that location is equal to zero or is less than a preset threshold. The preset threshold could be user defined. In other words, the process will add the UID as soon as a potential location is analyzed for which the overlap is less than a desired value. Finalized signature document 250 includes UID 251 at UID location 241 which does not overlap the content of the signature document as it did in FIG. 1.

Specific approaches for the parsing, measuring, touring, selection, and application steps described above are provided below. Means for conducting each of these steps, and others, are likewise provided. Modules for conducting each step can be implemented using non-transitory computer-readable media storing instructions that can be executed by a processor. The processor and memory may be available to one or more servers that are instantiating the electronic signature service, one or more servers that are specifically tasked with applying the UID to the signature document, a browser operating on a client device, or any combination of those and other elements.

Step 201 involves parsing an image file of a signature document to obtain a content vector. This execution of this step does not require any ex ante knowledge of the characteristics of the signature document or the location of content within the signature document. As such, the electronic signature service can operate with any standard image file format such as .tiff, .jpeg, .gif, .png, .bmp, raw image files, and others. The execution of step 201 can involve analyzing each cell of the image file to determine if the cell includes content. Alternatively, step 201 can involve subsampling the expanse of the image file and determining if each sampled cell included content. The determination as to the presence or absence of content in the cell could then be used to make an assumption as to the presence or absence of content in nearby cells as well. The content vector will include a set of values that indicate whether or not the image file includes content at a location that is uniquely associated with a vector address of that value. The content vector can be utilized in later steps to measure the quantity of overlap between the UID and the content of the signature document.

Specific approaches for the execution of step 201 can be described with reference to FIG. 3 which includes a flow chart 300 for a set of methods of parsing an image file. The image file can be uploaded or otherwise delivered to the electronic signature service and parsed using the one or more servers that are used to instantiate the service. The step of parsing can be conducted by the one or more servers operating in combination with computer-readable instructions. The computer-readable instructions can be source code written in PHP, Python, Node.js, or any scripting language. The computer-readable instructions may instantiate modules capable of executing one of more of the steps in flow chart 300. In particular, a means for parsing could be the hardware and software necessary to instantiate the modules that execute steps 303, 304, and 305 as described below.

Flow chart 300 beings with a step 301 of preprocessing an image file. This step may involve converting the image file format into a canonical format for use by the modules used to implement downstream steps of flow chart 300. Step 301 can include recognizing a file type of the image file, obtaining data from a header of the file to assist in processing the payload of the file, and converting the data in the payload into the canonical format. For example, the execution of step 301 can involve preprocessing the image file to convert the file into a two-dimensional matrix of greyscale values. The cells of the image will thereby be converted into a two-dimensional matrix of greyscale values corresponding to pixels in the image. Using .bmp with a 32-bit per pixel (32 bpp) encoding as an example, this process can involve obtaining the pixel encoding from a header of the file, obtaining the PixelArray segment of the file, and converting each 32-bit pixel value into a greyscale value. This conversion can be conducted by taking a weighted average of the three separate values for the red, blue, and green components of a pixel, and storing the scalar value as the greyscale value for that pixel. Alternative approaches can be utilized such as those that preserve color information for later steps in flow chart 200 such as those that rely on the subjective value of the content.

Flow chart 300 can continue with an optional step 302 of measuring an average pixel intensity in the image file. In particular, a means for measuring an average pixel intensity could be the hardware and software necessary to instantiate a module that analyzes each pixel in the image file and calculates the mean value of all of the pixel intensities. In another example, a means for measuring an average pixel intensity could be the hardware and software necessary to instantiate a module that analyzes each pixel in the image file and selects the median value of all of the pixel intensities. In keeping with the above example of a preprocessed image file that included a two-dimensional matrix of greyscale values, the means for measuring could involve a module that screened any padding bits in the matrix, summed all of the scalar values in the matrix, and divided by the number of elements in the matrix associated with the summed scalar values.

Figure 3:
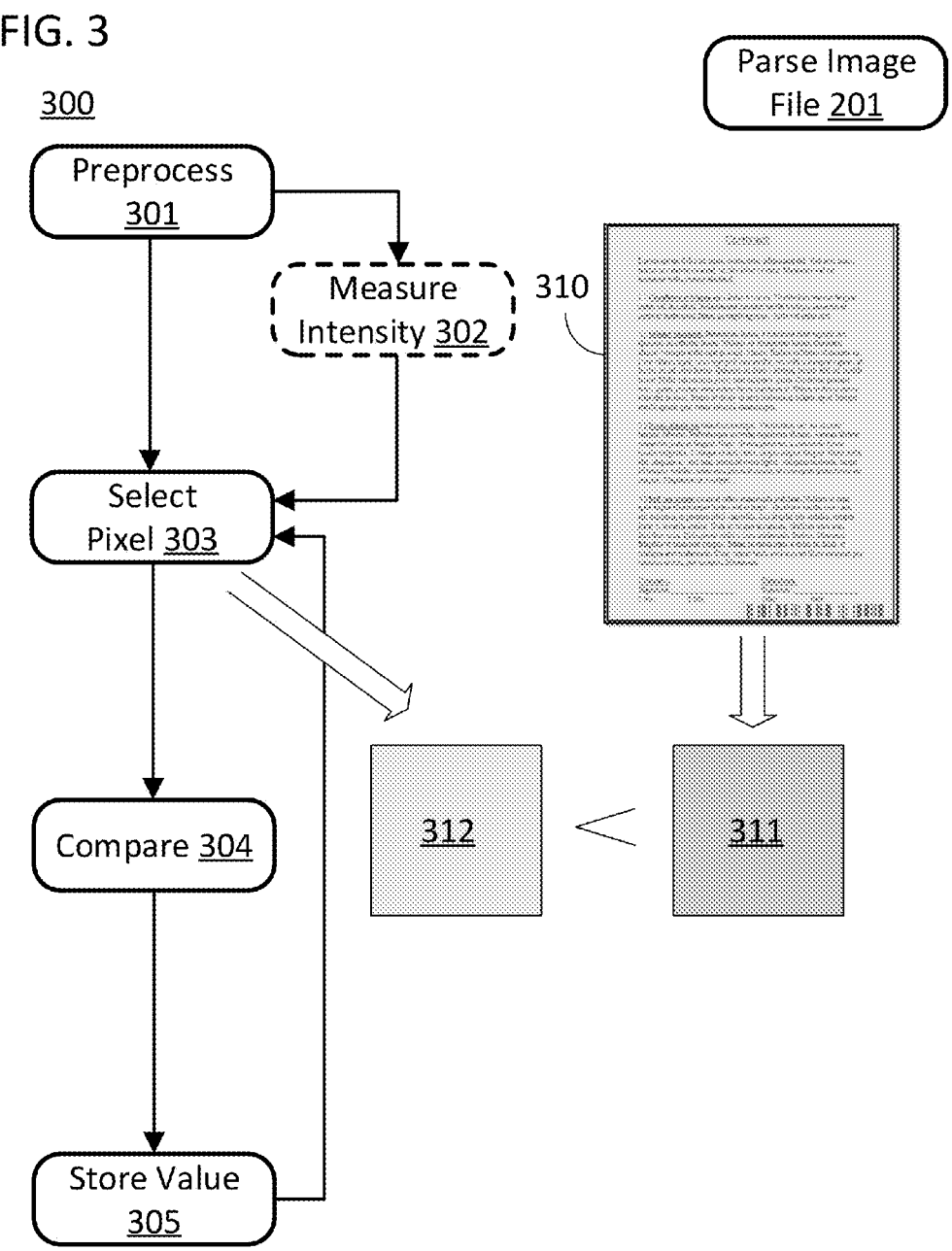
FIG. 3 is a flow chart for a set of methods for parsing an image file in accordance with certain approaches disclosed herein.

In the illustrated example of FIG. 3, the image file of the signature document 310 does not have a white background and is instead biased by an off-white background color. With signature documents that comprise a majority of textual content using standard fonts and known human alphabets, the average value taken across the image will represent the background color with high accuracy because a majority of pixels in the document are equivalent to the background color even at the character level. As such, the execution of step 302 would obtain a value representative of this background color for later use by the methods of flow chart 300.

Flow chart 300 can continue with a step 303 in which a pixel in the preprocessed image file is selected for analysis and step 304 in which the selected pixel is compared against a content indicator threshold. The means for selection can involve a script that loads the value into a variable for comparison. The means for comparing the pixel intensity could be the hardware and software necessary to instantiate a module that can execute the following procedures. In situations in which the image file includes pixel values that are pure black or white values indicated by a digital value, the execution of step 304 could be executed by a Boolean "Equal to" routine available in standard scripting programming languages. For example, the step could compare the value to a one by determining if the pixel value was equal to true. In situations in which the image file includes pixel values that are more complex, the means for comparing the pixel intensity of the pixel selected in step 303 with the content indicator threshold can involve a greater than or a less than routine as is provided in the routines of standard scripting programming languages. In the illustrated case, pixel intensity value 312 indicates that the pixel is not white, but comparison step 304 is conducted against a non-zero content indicator threshold obtained from the prior execution of step 302. As a result, the comparison will produce a result indicating that there is not content associated with the pixel having pixel intensity value 312. The average pixel intensity obtained in step 302 can be used in various ways to set a content indicator threshold. For example, the content indicator threshold 311 could be equal to the average pixel intensity with a buffer value added such as 10% of the scale from lowest to highest intensity values in the image file of the signature document. The scale could be calculated from data collected during the intensity measuring step 302.

Flow chart 300 can continue with a step 305 of storing the value that results from comparison step 304. The means for storing step 305 can involve an assignment statement as is provided in the routines of standard scripting programming languages. The step can be executed in a loop with steps 304 and 303 in which all of the elements of an image file are analyzed. The values can be stored in a memory. The collection of values stored through the one or more executions of step 305 will result in the content vector for the electronic signature document.

The content vector for the signature document can include a set of values where each value in the content vector reflects a comparison of the pixel intensity with the content indicator threshold performed in step 304. Alternatively, multiple values in the content vector can be extrapolated based on one execution of the comparison conducted in step 304. The content vector can include a set of addresses that uniquely correspond with a set of locations in the image of the electronic signature document. Each value in the content vector can indicate content at a corresponding location in the image. The content vector can be binary and include binary values where a one indicates content at the pixel location at a zero indicates no content at the pixel location. In other approaches, the content vector can have integer values that encode additional information regarding the content at the specified location such as a pixel intensity, or an estimated subjective value for the content at that location. The subjective value of the content can be derived using the location in the document or other factors. The content vector can also be a tensor. One of the dimensions of the tensor could corresponds with a page number of the signature document.

Parsing the image file could include additional forms of processing between the image file and the content vector. For example, modules could be utilized to recognize and remove blotches or other artifacts in the image that may have high intensities, but are not content. A similar effect could be produced via the encoding of a subjective value of the content at a given location where the routine would encode a low subjective value for regions that appeared to be blotches or other artifacts. In either case, the modules could identify areas of the image file that had higher content densities than a standard text character. This module could operate as part of the loop for steps 303, 304, and 305. In particular, the module could interrupt the values being stored in step 305 if it detected that an unnaturally large number of pixels in close proximity were expressing content. For example, content pixel densities in excess of 75% over the space of 50 square pixels could be indicative of artifacts in the signature document.

Approaches used to parse the image file can likewise be utilized to parse an image of the UID for use in the execution of later steps as described below. However, the electronic signature service will generally have ex ante knowledge of the UID as it will generally produce the UID itself. Therefore, the electronic signature service could alternatively generate a universal identifier content vector for the UID at the same time as the UID was generated using a routine that mapped characters of the UID to the same format that the electronic signature service used when producing the content vector for the signature document.

Figure 4:
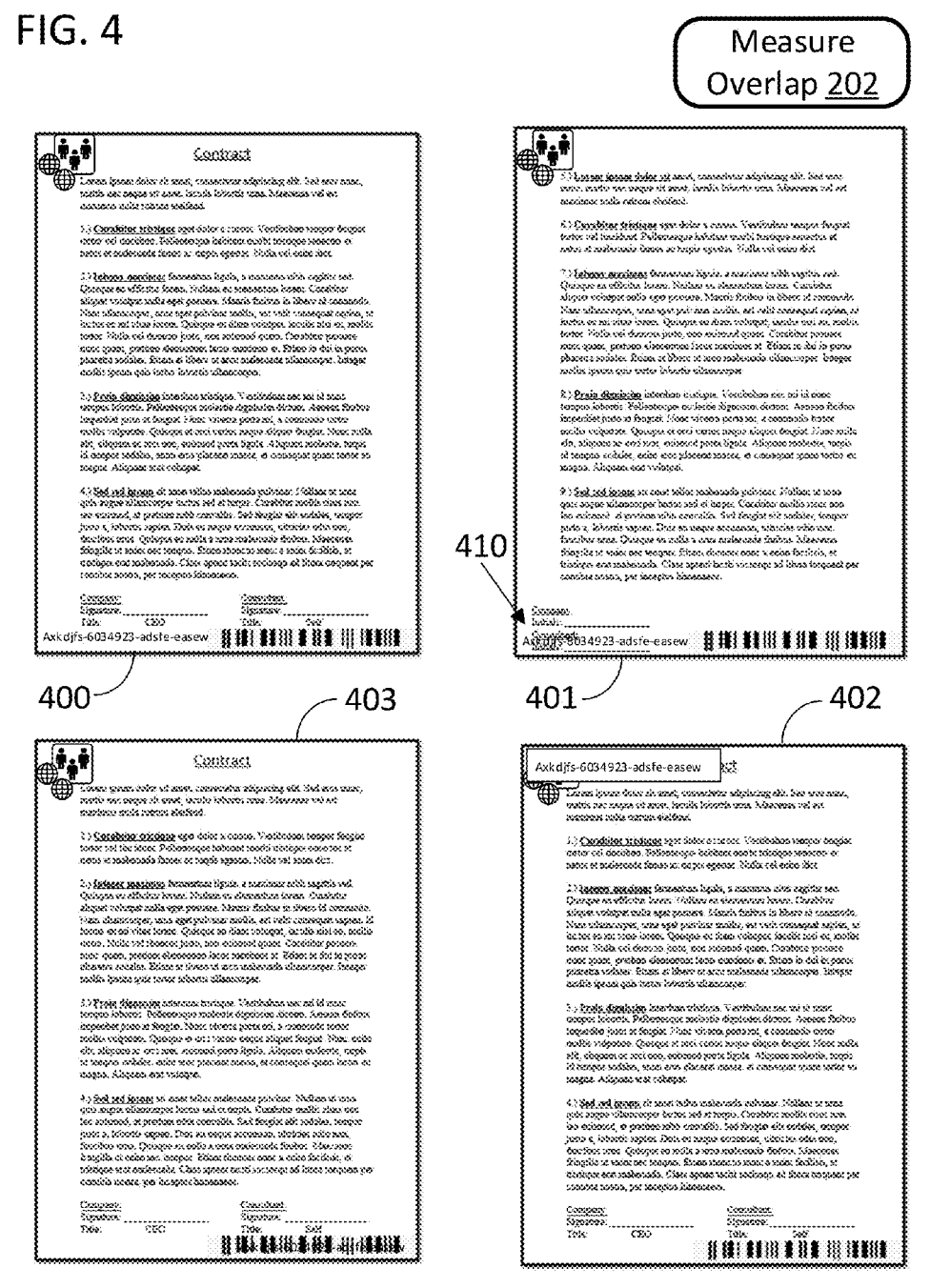

Specific approaches for the execution of step 202 can be described with reference to FIG. 4 which includes illustrations of a UID in potential locations on a contract. The step of measuring can be conducted by the one or more servers operating in combination with computer-readable instructions. The computer-readable instructions can be source code written in PHP, Python, Node.js, or any scripting language. The computer-readable instructions may instantiate modules capable of executing one or more sub-steps necessary for the execution of step 202. In particular, a means for measuring an overlap condition could be the hardware and software necessary to instantiate the modules that measure an overlap quantity for a potential UID location using the content vector obtained in the execution of step 201. The overlap quantity could be a scalar value indicating the number of content pixels between the UID in the potential location and the document that would overlap if the UID were placed in that potential location. The step of measuring could also include obtaining an overlap quality factor for the potential UID location. In some approaches, the same data structure will provide the overlap quality and quantity factors.

The step of measuring an overlap quantity for a potential UID location can comprise applying the UID to a potential location in the contract which could be set to a default location such as the bottom left corner of the document, as in image 400. The means for measuring the overlap quantity could be the hardware and software necessary to instantiate a module that mapped a specific pixel of the image file to the potential UID location, analyzed an amount of content in an area around that specific pixel, and set the measured amount equal to the overlapped quantity of pixels in that area. In the example of image 400, the overlap quantity would be zero. However, the same operation could be conducted across multiple pages of the document. For example, image 401 could be the second page of a contract that began with image 400. As illustrated by image 401, an area of content corresponding to an initialing area 410 could be repeated on multiple pages, but not the first page, such that applying the UID based solely on the first page would lead to an unacceptable result. As such, an overlap quantity that took account of the placement of the UID on each page of the document would provide a more accurate measure of the cost of applying the UID to that potential location. The utilization of content vectors in the form of tensors with a dimension corresponding to multiple pages could be utilized to alleviate this issue during the execution of step 202.

The analysis of the amount of content in the area around a given potential location can be conducted in numerous ways. The analysis of the amount of content in the area around the pixel could be conducted using an approximation of the UID as a solid block of content. For example, with reference to image 402, the degree of overlap could just add up the values in the content vector in an area equal to a quadrilateral with dimensions set by the vertical and lateral expanse of the UID in pixels. Alternatively, the analysis of the amount of content in the area around the pixel could be conducted using a universal identifier content vector. For example, in image 403, a pixel by pixel analysis of the overlap between the UID and the barcode could be used to provide the overlap quantity value. If both the UID content vector and the signature document content vector included binary values, this operation could include a module selecting a portion of the document's content vector that aligned with the potential location, and conducting an AND operation on the content vectors of the document and UID.

The analysis to obtain the overlap quality factor can be conducted in numerous ways. A means for measuring an overlap quality factor for a potential UID location could be the hardware and software needed to instantiate a module that can execute the following procedures. As mentioned previously, the generation of the quantity factor can be conducted in such a way that the subjective value of the content at any given pixel is taken into consideration at the same time. For example, the location of a pixel of content could be used as a proxy for the subjective value of the content, and the quality factor could be calculated using the location of the overlapped pixel as a scaling factor. Alternatively, the subjective value of the overlapped content can be determined and tracked separately. This determination can be conducted based on the density of the pixels being overlapped, or image recognition techniques that determine if overlapped content includes a signature, a watermark, contract text, or other elements that are commonly found in electronic signature documents. For example, a collection of pixels indicating a signature may be given a higher quality factor value than pixels indicating a blotch or other artifact in the signature document. Both the quantity factor and the quality factor can be used during the selection step to decide where the UID will be applied.

Step 202 can be conducted multiple times to obtain multiple overlap quantity factors for various potential locations in the document. The first potential location can be set by default. The electronic signature service can also include a means for touring the image file to obtain a second overlap quantity for a second potential universal identifier location. The means for touring can be the hardware and software necessary to instantiate a module that selects potential universal identifier locations for further executions of step 202. The module can include a set of stored locations that were previously programmed by the electronic signature service or that were configured by a user of the electronic signature service. Alternatively the module could include a set of instructions that step the potential UID location in a fixed direction based on the location of content in the signature document. To use the example of a set of stored locations for touring, the UID could be placed automatically via a ranked list of alternative locations, where each option was analyzed to see if an overlap condition occurred, and the next option was adopted if an overlap condition would occur. The next location can be guided by an order of locations that a user or the electronic signature service has defined as acceptable in order of priority (i.e., lower left horizontal, then middle left vertical, etc.). The next location can be a wholly separate portion of the document or it can be in close proximity to the prior location such that the touring module steps the location away from the original location until an acceptable value for the overlap quantity or quality is found.

Figure 5:
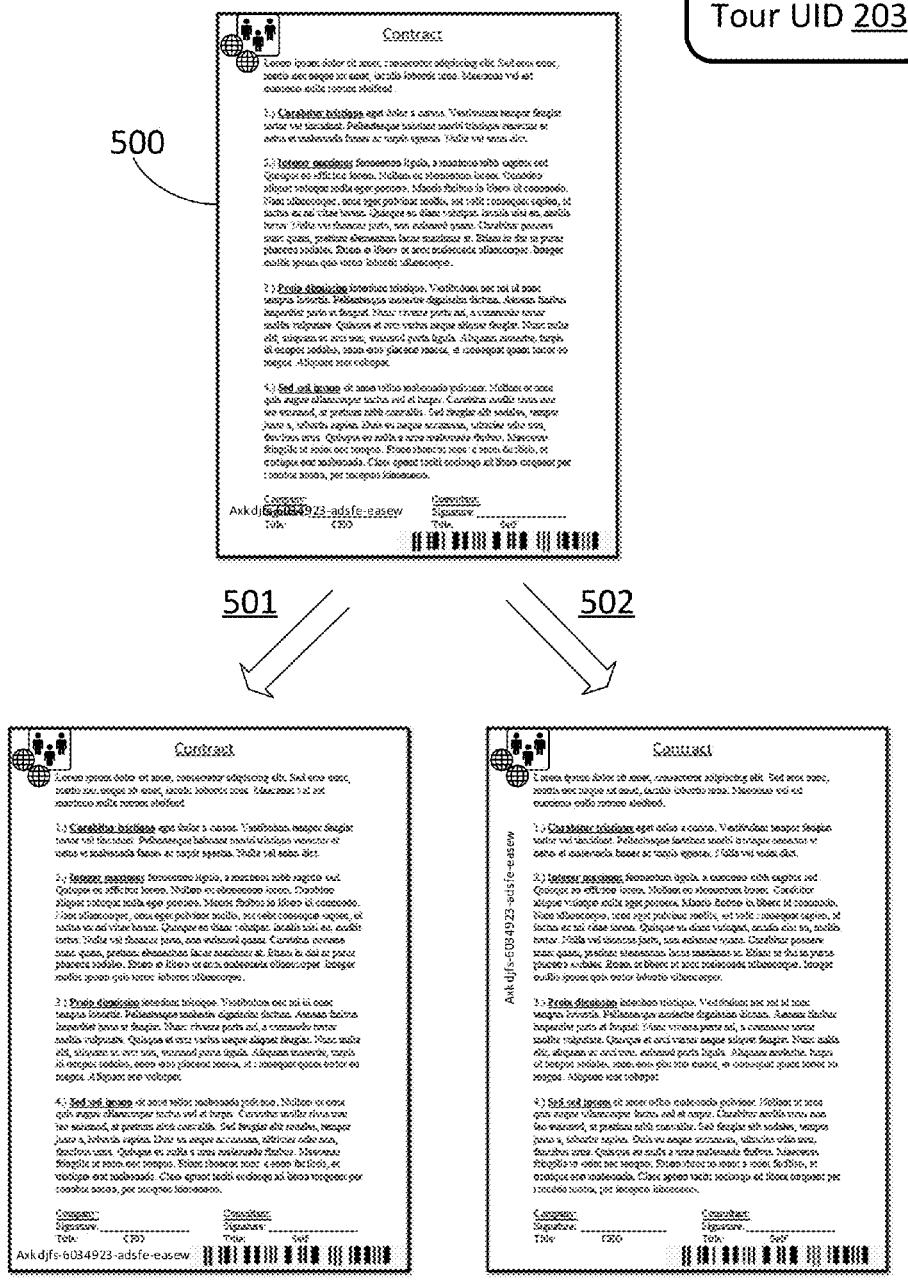
FIG. 5 is an illustration of various methods for touring a UID through various potential locations on a signature document in accordance with certain approaches disclosed herein.

FIG. 5 illustrates two potential implementations of step 203. Image 500 illustrates a contract in which the UID has been applied to the contract and a measurement has been conducted to indicate that the overlap quantity is substantially large. As such, step 203 will be conducted to select an alternative potential location for the UID. In process 501, the touring module has stepped the potential location out from the center of the document in steps equal to a specified number of pixels or percentages of the overall size of the document. The direction in which the potential location is stepped can be set to a fixed direction away from the center of the document, or some other fixed direction. The stepping direction can also be randomized. The stepping direction can also be conducted based on the overlap measurement, or some other analysis involving the content vector. For example, the stepping direction can be set to move away from a center of gravity for the overlap measured between the UID and the content of the document. The stepping direction can also be towards the center of the document. The stepping direction can be user specified. Alternatively, in process 502, the touring module has skipped the potential location of the UID to a wholly separate portion of the document. In either case, the UID is visible with zero overlap. However, process 501 produces a document in which the UID is closer to its default location.

Execution of step 204 can be conducted independently of the number of iterations through steps 202 and 203. For example, the electronic signature service can be designed to tour the UID through a set number of potential locations, and step 204 will be conducted by comparing the overlap quantity and potential overlap quality factor for each of those locations to make a determination. Alternatively, the execution of step 204 can prevent further execution of step 203 by detecting if a degree of overlap is acceptable. If step 203 is conducted in priority order, this should assure that the UID is placed in the most desirable position while remaining below a certain maximum degree of acceptable overlap. However, allowing step 203 to collect data on multiple locations before executing step 205 will allow the electronic signature service to make a determination that trades off the priority of certain locations with a degree of overlap associated with each place, instead of accepting a fixed degree of overlap that is assumed to be acceptable for any of the potential locations. Step 203 can also be skipped by using a white space detector and applying the UID to the closest blank space to the original potential location. The white space detector can operate on the content vector.

Execution of step 204 can be conducted using both the quality and the quantity factor associated with an overlap. The means for selecting could be the hardware and software necessary to instantiate a module that compares the overlap quantity to a second threshold associated with an acceptable overlap value. The comparison could be conducted by a compare operation from a standard scripting language. The acceptable overlap value could be set by default or could be user configurable. The means for selecting can also take preset subjective preferences into consideration when selecting a place for the UID. For example, a user could list a set of locations that are acceptable for applying the UID, and the electronic signature service could measure a quality and quantity factor associated with the overlap, and apply the UID to the first area that has an overlap quality and/or overlap quantity factor below a second threshold. The set of locations could be included in a subjective preference file for use by the means for selecting. However, the subjective preference file could also, or in the alternative, specify or rank types of content that the user favors that should not be overlapped as opposed to a set of locations that the use favors for the application of the UID. The step can also involve manually presenting a set of options for the UID to a user and accepting a selection of one of the locations. The set of options could be selected from a set of numerous potential locations based on their minimization of the overlap quantity or quality factor associated with other locations.

After the UID location is selected, the UID can be applied to the signature document as in step 205. Execution of step 205 can be conducted by a means for applying the UID to a signature document. The means for applying the UID could be the hardware and software necessary to instantiate a module with access to both the signature document, the UID location selected in step 204, and the UID itself. The module could use the UID location to access a location in the signature document, and add the UID at that location. The content of the UID and the signature document could then be flattened into the same data structure. Future iterations of the execution process may then consider the previously applied UID as part of the content of the signature document and will avoid creating an overlap condition with the previously applied UID. As such, documents that need to be executed multiple times can benefit from the approaches disclosed herein as the same system can apply the UID in different locations as needed.

Any of the methods described herein can be conducted through the use of a computer system. For example, the electronic signature service and any of the means disclosed herein could be provided by a processing system acting in tandem with a memory. A user would be able to access the service through the use of a routing system and a user interface system. Any method steps involving providing or accepting things to and from a user can be conducted using interface system. Any method steps involving executing an action can be conducted using processing system alone or in combination with memory. The machine described is only an illustrative computer system that is amenable to operation in accordance with embodiments disclosed herein and variant computer system topologies may be used in its stead. Nothing in this description should limit the processor of processing system to a single processor, as the function of this block can be accomplished by multiple physical processors located either on a single work station or server, or distributed through a network. It is not essential for memory to be physically distinguishable from processing system, as they are merely illustrated as separate blocks for purposes of invoking common conceptions of how computing systems operate. Routing system could be the internal routing system of a single work station, a LAN, a WAN, a wired or wireless network, the Internet, or any other system capable of routing signals. User interface system could be a work station, a computer, a mobile phone or other mobile device, or any computing device or group of computing devices capable of receiving inputs from a single user or group of users. The steps of the various flow charts in the examples above can be executed by the processing system of described above executing instructions to implement the objectives of those steps. The instructions can be encoded and stored on a non-transitory computer readable storage medium. Non-limiting examples of such non-transitory computer readable storage media include binary computer code stored in CDROM, hard disk drives, flash drives, or any computerized RAM. The code could be stored as a .exe or .dmg file. Non-transitory computer readable storage media can also include any file that is stored on a server in volatile or non-volatile memory and prepared for transmission via FTP, HTTP, or HTTPS. Any of the means for conducting a step described above can be conducted by a module instantiated on hardware of the electronic signature service or a third party. The steps conducted by those means can be conducted by the one or more servers operating in combination with computer-readable instructions. The computer-readable instructions can be source code written in PHP, Python, Node.js, or any scripting language. The computer-readable instructions may instantiate modules capable of executing one of more of the steps in any of the methods disclosed herein.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure where generally directed to the application of a UID to a contract in an electronic signature service, the same approaches could be utilized to assist in the application of any number of visual data elements to a document in an automated fashion in order to prevent overlap. For example, similar approaches could be utilized for the automated application of watermarks, seals, stamps, bates numbers, or pagination to a signature document. These and other modifications and variations to the present invention may be practiced by those skilled in the art, without departing from the scope of the present invention, which is more particularly set forth in the appended claims.

What is claimed is:

1. A computer-implemented system for preventing overlap during the application of a universal identifier to a signature document in an electronic signature service comprising:
 a means for parsing an image file of the signature document to obtain a content vector, wherein a set of addresses of the content vector uniquely correspond with a set of locations in the image, wherein at least one value in the content vector indicates unexecuted signature document content, and wherein each value in the content vector indicates content at a corresponding location in the image;
 a means for measuring an overlap quantity for a potential universal identifier location, wherein the means for measuring uses the content vector to measure the overlap quantity;
 a means for selecting a universal identifier location in the signature document, wherein the means for selecting uses the overlap quantity; and
 a means for applying the universal identifier to the signature document, wherein the means for applying uses the universal identifier location.

2. The computer-implemented system of claim 1, wherein the means for parsing comprises:
 a means for comparing a pixel intensity with a content indicator threshold;
 wherein each value in the content vector is binary; and
 wherein each value in the content vector reflects a comparison of the pixel intensity with the content indicator threshold performed by the means for comparing.

3. The computer-implemented system of claim 2, wherein the means for parsing comprises:
 a means for measuring an average pixel intensity in the image file;
 wherein the content indicator threshold is set using the average pixel intensity.

4. The computer-implemented system of claim 1, further comprising:
 a means for touring the image file to obtain a second overlap quantity for a second potential universal identifier location using the means for measuring;
 wherein the means for selecting uses the overlap quantity and the second overlap quantity.

5. The computer-implemented system of claim 4, wherein:
 the means for selecting compares the overlap quantity and the second overlap quantity to a second threshold; and
 the second threshold is an acceptable overlap value.

6. The computer-implemented system of claim 5, further comprising:
 a means for measuring an overlap quality factor for the potential universal identifier location;
 wherein the means for selecting also uses the overlap quality factor.

7. The computer-implemented system of claim 1, further comprising:
 a means for parsing an image file of the universal identifier to obtain a universal identifier content vector;
 wherein the means for measuring also uses the content vector to measure the universal identifier.

8. The computer-implemented system of claim 1, wherein:
 the content vector is a tensor; and
 a dimension of the tensor corresponds to a page number in the signature document.

9. A computer-implemented method for preventing overlap during the application of a universal identifier to a signature document in an electronic signature service comprising:
 parsing an image file of the signature document to obtain a content vector, wherein a set of addresses of the content vector uniquely corresponds with a set of locations in the image, wherein at least one value in the content vector indicates unexecuted signature document content, and wherein each value in the content vector indicates content at a corresponding location in the image;
 measuring an overlap quantity for a potential universal identifier location, wherein the measuring uses the content vector to measure the overlap quantity;
 selecting a universal identifier location in the signature document, wherein the selecting uses the overlap quantity; and applying the universal identifier to the signature document, wherein the applying uses the universal identifier location.

10. The computer-implemented method of claim 9, wherein the parsing step comprises:
comparing a pixel intensity with a content indicator threshold;
wherein each value in the content vector is binary; and
wherein each value in the content vector reflects a comparison of the pixel intensity with the content indicator threshold performed during the comparing step.

11. The computer-implemented method of claim 10, wherein the parsing step comprises:
measuring an average pixel intensity in the image file;
wherein the content indicator threshold is set using the average pixel intensity.

12. The computer-implemented method of claim 9, further comprising:
touring the image file to obtain a second overlap quantity for a second potential universal identifier location during the measuring step;
wherein the selecting step uses the overlap quantity and the second overlap quantity.

13. The computer-implemented method of claim 12, wherein:
the selecting step compares the overlap quantity and the second overlap quantity to a second threshold; and
the second threshold is an acceptable overlap value.

14. The computer-implemented method of claim 13, further comprising:
measuring an overlap quality factor for the potential universal identifier location;
wherein the selecting step also uses the overlap quality factor.

15. The computer-implemented method of claim 9, further comprising:
parsing an image file of the universal identifier to obtain a universal identifier content vector;
wherein the measuring step also uses the content vector to measure the universal identifier.

16. The computer-implemented method of claim 9, wherein:
the content vector is a tensor; and
a dimension of the tensor corresponds to a page number in the signature document.

17. A non-transitory computer-readable medium storing instructions for the execution of a method for preventing overlap during the application of a universal identifier to a signature document in an electronic signature service, wherein the method comprises:
parsing an image file of the signature document to obtain a content vector, wherein a set of addresses of the content vector uniquely correspond with a set of locations in the image, wherein at least one value in the content vector indicates unexecuted signature document content, and wherein each value in the content vector indicates content at a corresponding location in the image;
measuring an overlap quantity for a potential universal identifier location, wherein the measuring uses the content vector to measure the overlap quantity;
selecting a universal identifier location in the signature document, wherein the selecting uses the overlap quantity; and
applying the universal identifier to the signature document, wherein the applying uses the universal identifier location.

18. The non-transitory computer-readable medium of claim 17, wherein the parsing step comprises:
comparing a pixel intensity with a content indicator threshold;
wherein each value in the content vector is binary; and
wherein each value in the content vector reflects a comparison of the pixel intensity with the content indicator threshold performed during the comparing step.

19. The non-transitory computer-readable medium of claim 18, wherein the parsing step comprises:
measuring an average pixel intensity in the image file;
wherein the content indicator threshold is set using the average pixel intensity.

20. The non-transitory computer-readable medium of claim 17, wherein the method further comprises:
touring the image file to obtain a second overlap quantity for a second potential universal identifier location during the measuring step;
wherein the selecting step uses the overlap quantity and the second overlap quantity.

21. The non-transitory computer-readable medium of claim 20, wherein:
the selecting step compares the overlap quantity and the second overlap quantity to a second threshold; and
the second threshold is an acceptable overlap value.

22. The non-transitory computer-readable medium of claim 21, wherein the method further comprises:
measuring an overlap quality factor for the potential universal identifier location;
wherein the selecting step also uses the overlap quality factor.

23. The non-transitory computer-readable medium of claim 17, wherein the method further comprises:
parsing an image file of the universal identifier to obtain a universal identifier content vector;
wherein the measuring step also uses the content vector to measure the universal identifier.

24. The non-transitory computer-readable medium of claim 17, wherein:
the content vector is a tensor; and
a dimension of the tensor corresponds to a page number in the signature document.

* * * * *